United States Patent Office 2,848,442
Patented Aug. 19, 1958

2,848,442
OIL RESISTANT CONJUGATED DIENE-HETEROCYCLIC NITROGEN BASE COPOLYMERS

Joseph F. Svetlik, Sr., Phillips, Tex., assignor to Phillips Petroleum Company, a corporation of Delaware No Drawing. Application April 11, 1955
Serial No. 500,685

7 Claims. (Cl. 260—82.1)

The invention relates to oil resistant rubber. In a further aspect this invention relates to a method by which the oil resistance of rubbery copolymers of conjugated dienes with copolymerizable heterocyclic nitrogen bases of the pyridine and quinoline series can be very considerably improved. In a further aspect this invention relates to the products produced by this process.

In a copending application, Pritchard Serial No. 284,448, filed April 25, 1952, and now abandoned, it is disclosed that the properties of polymers of conjugated dienes and copolymerizable heterocyclic nitrogen bases can be modified by treatment with quaternizing agents such as alkyl halides, alkyl sulfates, and many additional reactive compounds. That application discloses that rubbery polymers can be made more oil resistant by treatment with the quaternizing agents.

I have discovered that a particular quaternizing agent produces products which are characterized by a very substantial improvement in oil resistance when compared to products produced by the quaternizing agents disclosed in the Pritchard application and the other properties of these products, such as high tensile strength, low freeze point, and cold compression set are maintained or improved. This new quaternizing agent is chloranil, sometimes identified as tetra-chloroquinone. The chloranil performs the dual function of a quaternizing agent and a vulcanizing agent so that rubbery, oil resistant polymeric materials can be made containing no sulfur or other conventional vulcanizing agents. However, I frequently include a conventional vulcanizing agent with the chloranil where the presence of sulfur is not objectionable.

The following are objects of my invention:

An object of my invention is to provide oil resistant rubber. A further object of my invention is to improve the oil resistance of polymers of conjugated dienes with copolymerizable heterocyclic nitrogen bases of the pyridine and quinoline series. A further object of my invention is to provide oil resistant rubber prepared from polymers of conjugated diene with the heterocyclic nitrogen bases, said rubber containing no sulfur in the cured composition.

Other objects and advantages of this invention will be apparent to one skilled in the art upon reading this disclosure.

The following examples illustrate specific embodiments of my invention.

Example 1

A 62 Mooney (ML–4) 85/15 butadiene/2-methyl-5-vinylpyridine copolymer was produced from a series of emulsion polymerization runs made at 122° F. Modifier charges of 0.31 to 0.28 part tert-dodecyl mercaptan resulted in polymers with stripped Mooney values in the range from 36 to 98. Latices from five batches were blended and the blend coagulated with brine-acid at a pH of 6. To remove the soap from the polymer, the crumb was extracted six times with caustic (pH. 9.9–10.5, temperature 150° F.) and then washed five times with water at 150° F. The polymerization recipe was as follows:

| | Parts by weight |
|---|---|
| Water | 180 |
| Butadiene | 85 |
| 2-methyl-5-vinylpyridine | 15 |
| Sodium fatty acid soap | 4.3 |
| $K_2S_2O_8$ | 0.3 |
| Tert-dodecyl mercaptan | Variable |
| Shortstop: Goodrite 3955 [1] | 0.15 |
| Antioxidant (percent based on polymer): phenyl-beta-naphthylamine | 2.0 |

[1] 50/50 mixture of sodium dimethyldithiocarbamate and sulfur in the form of sodium polysulfide.

Results of the several runs were as follows:

| Time, Hours | Conversion, Percent | tert-Dodecyl Mercaptan, part | Mooney (ML–4) Stripped |
|---|---|---|---|
| 11.8 | 65 | 0.28 | 98 |
| 10.5 | 60 | 0.31 | 36 |
| 8.8 | 60 | 0.31 | 62 |
| 9.7 | 60 | 0.29 | 74 |
| 9.2 | 60 | 0.28 | 82 |

The butadiene/2-methyl-5-vinylpyridine rubbery copolymer was compounded in accordance with the following recipe using chloranil, benzal chloride, or epichlorohydrin as the quaternizing agent.

| | Parts by weight |
|---|---|
| Butadiene/2-methyl-5-vinylpyridine copolymer | 100 |
| Carbon black [1] | 60 |
| Zinc oxide | 5 |
| Stearic acid | 1.5 |
| TP–90B [2] | 10 |
| Sulfur | 1.5 |
| Altax [3] | 1.5 |
| Quaternizing agent | Variable |

[1] Philblack A.
[2] Dibutyl carbitol formal.
[3] Benzothiazyl disulfide.

Two additional runs were made using chloranil in the compounding recipe given above except that sulfur and Altax were omitted.

The samples were milled, cured 30 minutes at 307° F., and physical properties determined. The following results were obtained:

| Quaternizing Agent | | 212 F. Compression Set, Percent | Tensile, p. s. i. | Elongation, Percent | Shore Hardness | Cold Compression Set [1] | | 70/30 Isooctane/Toluene | | Skydrol, Percent Swelled |
|---|---|---|---|---|---|---|---|---|---|---|
| Type | Parts | | | | | Relaxed, 10 sec. | Relaxed, 30 min. | Percent Swelled | Percent Extracted | |
| Chloranil | 3 | 6.8 | 2,550 | 190 | 73 | 74.9 | 43.3 | 96.8 | 6.9 | 53.4 |
| | 5 | 5.8 | 2,870 | 145 | 79 | 78.7 | 44.9 | 75.1 | 6.6 | 45.9 |
| | 10 | 5.6 | 3,160 | 110 | 86.5 | 86.7 | 69.9 | 52.5 | 6.5 | 38.0 |
| | 2 5 | 2.2 | 2,400 | 170 | 76 | 71.7 | 40.2 | 87.7 | 7.0 | 47.9 |
| | 2 10 | 2.8 | 2,800 | 110 | 83.5 | 85.6 | 61.9 | 60.8 | 6.7 | 40.3 |
| Benzal Chloride | 5 | 6.8 | 2,650 | 280 | 66 | 69.8 | 34.6 | 109.2 | 8.0 | 62.1 |
| | 10 | 6.3 | 2,800 | 245 | 71 | 83.5 | 53.9 | 93.0 | 7.6 | 59.2 |
| | 15 | 6.8 | 3,250 | 270 | 74.5 | 92.3 | 71.8 | 75.3 | 8.0 | 59.9 |
| | 20 | 6.6 | 3,120 | 260 | 72.5 | 93.1 | 72.7 | 73.4 | 8.5 | 61.5 |
| Epichlorohydrin | 5 | 15.5 | 1,610 | 290 | 50.5 | 84.6 | 63.1 | 162.9 | 9.1 | 81.8 |
| | 10 | 18.6 | 1,400 | 275 | 59 | 88.2 | 73.2 | 175.7 | 9.5 | 84.2 |
| None | | 9.0 | 2,220 | 310 | 61.5 | 73.9 | 38.5 | 151.5 | 8.5 | 78.5 |

| Quaternizing Agent | Parts | Immersed Samples | | | | Freeze Point | | Compounded MS 1½ |
|---|---|---|---|---|---|---|---|---|
| | | 70/30 Isooctane/Toluene | | Skydrol | | T-R, C. | Gehman, C. | |
| | | Tensile, p. s. i. | Elong., Percent | Tensile, p. s. i. | Elong., Percent | | | |
| Chloranil | 3 | 710 | 80 | 1,210 | 115 | −70 | −72 | 45 |
| | 5 | 1,040 | 70 | 1,600 | 110 | −71 | −73 | 44 |
| | 10 | 1,220 | 60 | 1,600 | 70 | | −62 | 44 |
| | [2] 5 | 660 | 60 | 1,240 | 100 | −72 | −72 | 46.5 |
| | [2] 10 | 960 | 50 | 1,180 | 60 | | −72 | 46 |
| Benzal Chloride | 5 | 610 | 100 | 1,170 | 170 | −70 | −70 | 36.5 |
| | 10 | 760 | 100 | 1,360 | 160 | −69 | −73 | 30 |
| | 15 | 590 | 80 | 1,430 | 160 | | −69 | 27 |
| | 20 | 1,010 | 120 | 1,140 | 130 | | −66 | 23 |
| Epichlorohydrin | 5 | 180 | 70 | 500 | 150 | −72 | −72 | 65 |
| | 10 | 120 | 65 | 440 | 140 | −71 | −73 | 80 |
| None | | 310 | 90 | 610 | 155 | −70 | −72 | 36 |

[1] 45 minutes cure time.
[2] Sulfur and Altax were omitted from these samples.

The oil resistance of the stocks was judged on the basis of tensile strength following immersion for 70 hours in a solvent at 158° F. (ASTM 471–49T). Swelling and extraction determination were made following 48 hours immersion at 158° F. in 70/30 isooctane/toluene mixture and in Skydrol (a high boiling phosphate ester used as a pressure transfer medium for aircraft systems).

Examination of this table shows that an oil resistant stock containing chloranil is superior to stocks containing the other quaternizing agents, benzal chloride or epichlorohydrin. For instance, the percent swell and extraction data show that a small amount of chloranil, 3 parts, has a greater effect than 5 parts of either of the other quaternizing agents as far as the percent extracted by the isooctane/toluene mixture is concerned. This table also shows that stocks possessing these good properties are obtained even when the vulcanizing agent and the accelerator were omitted.

*Example II*

Two runs were made for the preparation of an 85/15 butadiene/2-methyl-5-vinylpyridine copolymer by emulsion polymerization at 122° F. in accordance with the following formulation:

| | Parts by weight |
|---|---|
| Water | 180 |
| Butadiene | 85 |
| 2-methyl-5-vinylpyridine | 15 |
| Sodium fatty acid soap | 4.3 |
| NaOH | 0.045 |
| $K_2S_2O_8$ | 0.3 |
| Tert-doceyl mercaptan | 0.29, 0.34 |
| Shortstop: Goodrite 3955 | 0.15 |
| Antioxidant (percent based on polymers): phenyl-beta-naphthylamine | 2.0 |

Results of the runs were as follows:

| Time, Hours | Conversion Percent | Mercaptan Part | Mooney (ML-4) | |
|---|---|---|---|---|
| | | | Blowdown | Shipped |
| 25.6 | 59 | 0.29 | 114 | 120 |
| 28.5 | 60 | 0.34 | 46 | 48 |

Products from the two runs were blended to give a 62 Mooney rubber.

This rubber was compounded in accordance with the recipe given in Example I using varying amounts of chloranil and diphenyldichloromethane. The materials were milled, cured 30 minutes at 307° F., and the physical properties were determined. The results are shown in the following table.

| Quaternizing Agent | | Compression Set, Percent | Tensile, p. s. i. | Elongation, Percent | Compounded MS 1½ at 212 F. | Shore Hardness | 70/30 Isooctane/Toluene [1] | | Skydrol, Swelled, Percent |
|---|---|---|---|---|---|---|---|---|---|
| Type | Parts | | | | | | Swelled, Percent | Extracted, Percent | |
| Chloranil | 3 | 8.4 | 2,660 | 185 | 57.5 | 71.5 | 96.4 | 7.7 | 53.6 |
| | 5 | 8.0 | 2,890 | 145 | 58.5 | 76.5 | 80.7 | 6.7 | 47.2 |
| | 10 | 7.4 | 3,120 | 110 | 57.5 | 83.5 | 55.5 | 6.6 | 49.9 |
| Diphenyldichloromethane | 10 | 7.1 | 3,180 | 320 | 30 | 68.5 | 91.8 | 9.4 | 59.7 |
| | 20 | 11.6 | 2,930 | 250 | 26.5 | 71 | 69.4 | 9.8 | 69.4 |
| None | | 11.0 | 2,460 | 320 | 32 | 58.5 | 148.4 | 8.5 | 81.9 |

| Quaternizing Agent | | Immersed Sample [1] | | | | Cold Compression Set | |
|---|---|---|---|---|---|---|---|
| | | 70/30 Isooctane/Toluene | | Skydrol | | | |
| Type | Parts | Tensile, p. s. i. | Elongation, Percent | Tensile, p. s. i. | Elongation, Percent | Relaxed, 10 sec. | Relaxed, 30 min. |
| Chloranil | 3 | 530 | 80 | 1,070 | 90 | 70.3 | 37.4 |
| | 5 | 550 | 50 | 1,430 | 100 | 80.0 | 46.9 |
| | 10 | 770 | 40 | 1,640 | 70 | 90.1 | 75.7 |
| Diphenyldichloromethane | 10 | 520 | 90 | 1,170 | 150 | 87.8 | 59.7 |
| | 20 | 790 | 100 | 910 | 130 | 92.5 | 73.8 |
| None | | 300 | 90 | 760 | 160 | 69.8 | 37.6 |

[1] 45 minutes cure time.

This table shows that the rubber cured with chloranil is more resistant to the solvent shown than is the rubber treated with the diphenyldichloromethane. Once again, a smaller amount of the preferred quaternizing agent has a greater effect than the larger amount of the other quaternizing agent when the extraction data are considered.

*Example III*

The butadiene/2-methyl-5-vinylpyridine rubber described in Example II was compounded using the following recipe:

|  | Parts by Weight | |
|---|---|---|
|  | I | II |
| Butadiene/2-methyl-5-vinylpyridine rubber | 100 | 100 |
| Carbon black (Gastex) | 100 | |
| Carbon black (Thermax) | | 150 |
| Zinc oxide | 5 | 5 |
| Stearic acid | 1.5 | 1.5 |
| Sulfur | 1.5 | 1.5 |
| Altax [1] | 1.5 | 1.5 |
| TP-90B [1] | 10 | 10 |
| Benzal chloride or chloranil | variable | variable |

[1] As in Example 1.

The stocks were milled and cured 30 minutes at 307° F. and physical properties determined. The following results were obtained:

| Benzal Chloride, Parts | Chloranil, Parts | Carbon Black | Compression Set, Percent | Tensile, p.s.i. | Elongation, Percent | Compounded MS 1½ at 212 F. | Shore Hardness | 70/30 Isooctane/Toluene [1] | | Skydrol,[2] Swelled, Percent |
|---|---|---|---|---|---|---|---|---|---|---|
|  |  |  |  |  |  |  |  | Swelled, Percent | Extracted, Percent |  |
| 15 | -- | Gastex | 6.0 | 2,990 | 160 | 35.5 | 77 | 70.6 | 6.0 | 51.9 |
| 20 | -- | Gastex | 6.9 | 3,170 | 220 | 33 | 78 | 61.0 | 6.3 | 52.4 |
| -- | 5 | Gastex | 6.7 | 2,930 | 120 | 67.5 | 83 | 53.6 | 5.6 | 40.1 |
| 15 | -- | Thermax | 8.8 | 1,830 | 325 | 31.5 | 71.5 | 83.0 | 5.0 | 52.0 |
| 20 | -- | Thermax | 7.1 | 1,930 | 335 | 30 | 73.5 | 57.1 | 5.3 | 52.7 |
| -- | 5 | Thermax | 6.4 | 1,950 | 155 | 57.5 | 80 | 67.8 | 4.6 | 37.6 |

| Benzal Chloride, Parts | Chloranil Parts | Carbon Black | Immersed Sample | | | | Cold Compression Set[1] | |
|---|---|---|---|---|---|---|---|---|
|  |  |  | 70/30 Isooctane/Toluene | | Skydrol | | | |
|  |  |  | Tensile, p.s.i. | Elongation, Percent | Tensile, p.s.i. | Elongation, Percent | Relaxed, 10 sec. | Relaxed, 30 min. |
| 15 | -------- | Gastex | 940 | 90 | 1,460 | 140 | 90.09 | 67.3 |
| 20 | -------- | Gastex | 1,110 | 100 | 1,500 | 150 | 92.9 | 77.1 |
| -------- | 5 | Gastex | 910 | 40 | 1,490 | 80 | 81.6 | 49.9 |
| 15 | -------- | Thermax | 770 | 180 | 970 | 270 | 90.3 | 67.0 |
| 20 | -------- | Thermax | 880 | 190 | 1,000 | 320 | 90.6 | 73.8 |
| -------- | 5 | Thermax | 870 | 80 | 1,220 | 160 | 80.6 | 46.1 |

[1] 45 minutes cure time.
[2] 75 minutes cure time.

*Example IV*

The polymerization recipe for the preparation of a 75/25 butadiene/2-methyl-5-vinylpyridine polymer prepared at 41 F. was as follows:

| | Parts by weight |
|---|---|
| Water | 180 |
| Butadiene | 75 |
| 2-methyl-5-vinylpyridine | 25 |
| Potassium fatty acid soap | 6 |
| KOH | 0.05 |
| KCl | 0.2 |
| $K_4P_2O_7$ | 0.165 |
| $FeSO_4 \cdot 7H_2O$ | 0.139 |
| Diisopropylbenzene hydroperoxide | 0.107 |
| Tert-dodecyl mercaptan | 0.32 |
| Shortstop: Goodrite 3955 | 0.15 |
| Antioxidant (percent based on polymer): phenyl-beta-naphthylamine | 2.0 |

This polymer was compounded using recipe I of Example III. Two runs were made, one using 5 parts chloranil per 100 parts rubber and a control in which no chloranil was used. The stocks were milled, cured 30 minutes at 307 F., and electrical resistivity determined. The following results were obtained:

| PHR Chloranil | Electrical Resistivity, Meg-Ohm/Cm. |
|---|---|
| 5 | 363,000 |
| | 134 |

*Example V*

Two runs were made for the copolymerization of butadiene with 2-vinyl-5-ethylpyridine in aqueous emulsion at 140 F., using the following recipe:

| | Parts by weight |
|---|---|
| Water | 220 |
| Butadiene | 85 |
| 2-vinyl-5-ethylpyridine | 15 |
| Sodium fatty acid soap | 8 |
| NaOH | 0.10 |
| Daxad 11 | 0.30 |
| $K_2S_2O_8$ | 0.40 |
| Tert-dodecyl mercaptan | 0.35, 0.80 |

Polymerization data were as follows:

| Mercaptan Part | Time, Hours | Conversion, Percent | Mooney (ML-4) Stripped |
|---|---|---|---|
| 0.35 | 11.4 | 86 | 103 |
| 0.80 | 14.0 | 90 | 28 |

Polymers from the two runs were blended to give a product having a Mooney value of 53.

The butadiene/2-vinyl-5-ethylpyridine copolymer was compounded in accordance with the following recipes, using chloranil and benzal chloride as quaternizing agents. Compounding recipes were as follows:

|  | Parts by Weight |  |
|---|---|---|
| Rubber | 100 | 100 |
| Philblack A | 60 | 60 |
| Zinc oxide | 5 | 5 |
| Stearic acid | 1.5 | 1.5 |
| Sulfur | 1.5 | 1.5 |
| Altax | 1.5 | 1.5 |
| Benzal chloride | 15 | |
| TP-90B | 10 | 10 |
| Chloranil | | 5 |

The stocks were milled, cured 30 minutes at 307 F., and physical properties determined. The following results were obtained:

|  | Quaternizing Agent | |
|---|---|---|
|  | Chloranil | Benzal Chloride |
| Compression set, percent | 9.0 | 5.6 |
| Tensile, p. s. i., 80 F., original | 2,330 | 2,200 |
| Elongation, percent, 80 F., original | 150 | 285 |
| Tensile, p. s. i., oven aged 24 hrs. at 212 F | 1,690 | 1,250 |
| Elongation, percent, oven aged 24 hrs. at 212 F | 80 | 125 |
| Shore Hardness | 79 | 71 |
| Compounded MS 1½ | 63 | 36.5 |
| Freeze point: |  |  |
| T-R, C | −67 | −65 |
| Gehman, C | −65 | −67 |
| Electrical resistivity, megohm/cm | 15,700 | 36 |
| Wet tensile, p. s. i., Skydrol | 980 | 555 |
| Wet tensile, p. s. i., 70/30 isooctane/toluene | 530 | 355 |
| Elongation, percent, Skydrol | 60 | 70 |
| Elongation, percent, 70/30 isooctane/toluene | 85 | 105 |
| Swelling, percent, 70/30 isooctane/toluene | 95.9 | 115.8 |
| Swelling, percent, Skydrol | 66.4 | 71.9 |
| Extraction, percent, 70/30 isooctane/toluene | 6.9 | 7.8 |

*Example VI*

An 85/15 butadiene/2-methyl-5-vinylpyridine polymer was prepared at 122 F. using the following polymerization recipe:

| | Parts by weight |
|---|---|
| Water | 180 |
| Butadiene | 85 |
| 2-methyl-5-vinylpyridine | 15 |
| Sodium fatty acid soap | 6 |
| NaOH | 0.05 |
| Daxad 11[1] | 0.20 |
| $K_2S_2O_8$ | 0.30 |
| Tert-dodecyl mercaptan | 0.27 |
| Shortstop: Goodrite 3955 | 0.15 |
| Antioxidant (percent based on polymer): phenyl-beta-naphthylamine | 2.0 |

[1] Sodium salt of condensed alkyl aryl sulfonic acid.

A conversion of 59 percent was reached in 14.7 hours. The rubber had a final Mooney value (ML-4) of 59.

Masterbatches were prepared with the polymer and with No. 1 smoked sheet on a roll mill in which 50 parts of carbon black (Philblack O) were incorporated. To these masterbatches chloranil was added in the amounts of 0, 0.25, 0.5, 2.0 and 5.0 parts per 100 parts of the rubber while maintaining the temperature below 180° F. using a cold mill. Each stock was subsequently mixed for 20 minutes, the temperature being adjusted to give a final batch temperature of 320 to 350° F. and a second portion of each stock was mixed at a temperature to give a temperature in the range of 250 to 270° F., this mixing being done in a Banbury mixer. The mixes are described as follows, the designation "OK" indicating that the material was suitable for further processing:

| PHR Chloranil | Rubber | Dump Temperature | Description | Mooney MS 1½ |
|---|---|---|---|---|
| *Stocks Mixed at 320–350° F.* | | | | |
| 0 | Bd/MVP | 315 | OK | 50 |
| 0.25 | Bd/MVP | 320 | OK | 66 |
| 0.50 | Bd/MVP | 330 | OK | 80 |
| 2.0 | Bd/MVP | 330 | Partially powdered | |
| 5.0 | Bd/MVP | | Powdered | |
| 0 | SS#1 | 325 | OK | 50 |
| 0.25 | SS#1 | 320 | OK | 46 |
| 0.50 | SS#1 | 320 | OK | 44 |
| 2.0 | SS#1 | 325 | OK | 53 |
| 5.0 | SS#1 | 325 | OK | 72 |
| *Stocks Mixed at 250–270° F.* | | | | |
| 0 | Bd/MVP | 260 | OK | 46 |
| 0.25 | Bd/MVP | 275 | OK | 66 |
| 0.5 | Bd/MVP | 270 | OK | 80 |
| 2.0 | Bd/MVP | 260 | So tough motor kicked out at 6'-7', again at 11', again at 12.5', batch dumped. | |
| 5.0 | Bd/MVP | 260 | Stalled the motor at 9' minutes, stock set-up. | |
| 0 | SS#1 | 245 | OK | 41 |
| 0.25 | SS#1 | 250 | OK | 40 |
| 0.5 | SS#1 | 255 | OK | 39 |
| 2.0 | SS#1 | 270 | OK | 71 |
| 5.0 | SS#1 | 260 | OK | >150 |

In Examples I through V the chloranil was incorporated in the polymer while maintaining the temperature of the stock below 230° F. by circulating cooling water through the rolls. This temperature limitation is important because heating to a higher temperature, as illustrated in Example VI, will cause the mixture to set up on the mill. This will prohibit further processing. This appears to be a peculiarity of this type of rubber due to the fact that chloranil acts in the dual capacity of a vulcanizing agent and a quaternizing agent. Its use as a vulcanizing agent has previously been known for natural rubber. Furthermore, it has been suggested that chloranil be incorporated with rubbers of this type but in much smaller amounts than I use. When the small amounts are used it is possible to handle the material in accordance with the teaching of the prior art.

In place of the pyridine derivatives used in the above examples, I can use a great many additoinal heterocyclic nitrogen bases. Preferred are those of the pyridine and quinoline series containing a vinyl or alpha-methyl-vinyl group. The polymers used as starting materials in this invention include homopolymers of the polymerizable heterocyclic nitrogen bases and copolymers thereof with materials copolymerizable therewith, such as conjugated dienes; styrene; various substituted styrenes, such as alkyl, alkoxy, and halogen-substituted styrenes; acrylonitrile; methacrylonitrile; methyl acrylate; methyl methacrylate; ethyl acrylate; butyl acrylate; and the like. Polymers prepared from various mixtures of heterocyclic nitrogen bases containing a vinyl or alpha-methylvinyl group with one or more other polymerizable materials are also applicable as well as terpolymers prepared from a heterocyclic nitrogen base containing a vinyl or alpha-methyl-vinyl group and two other types of monomers, e. g., a conjugated diene and a compound such as styrene, acrylonitrile, methyl acrylate, or the like.

The nitrogen containing monomers suitable for use in my invention are those having the structure

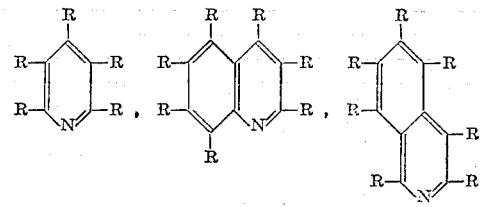

where R is selected from the group consisting of hydrogen, alkyl, vinyl, alpha-methylvinyl, nitro, alkoxy, halo, hydroxy, cyano, aryloxy, aryl, and combinations of these groups such as haloalkyl, alkylaryl, hydroxyaryl, and the like; at least one and not more than two of said groups being selected from the group consisting of vinyl and alpha-methylvinyl. It is preferred, in order to avoid steric hindrance, that the total number of carbon atoms in the substituted groups be not greater than 12. Examples of such compounds are 2-vinylpyridine; 2,5-divinylpyridine; 2-methyl-5-vinylpyridine; 2-vinyl-5-ethylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyiridine; 2-methyl-5-undecyl-3-vinylpyridine; 3-dodecyl-4,5-divinylpyridine; 2,4-dimethyl-5,6-dipentyl-3-vinylpyridine; 2-decyl-5(alpha-methylvinyl)pyridine; 3,5-di(alpha-methylvinyl)pyridine; 3-nitro-2-vinylpyridine; 2-vinyl-4-hydroxy-5-nitropyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methylphenyl)-3-vinyl-4-methylpyridine; 3-vinyl-5-(hydroxyphenyl)pyridine; 2-vinylquinoline; 2-vinyl-4-ethylquinoline; 3-vinyl-6,7-di-n-propylquinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; etc.

The conjugated dienes employed are preferably those which contain from four to six, inclusive, carbon atoms per molecule and include 1,3-butadiene, isoprene, piperylene, methylpentadiene, 2,3-dimethyl-1,3-butadiene, chloroprene, and others. However, conjugated dienes having more than six, such as eight, carbon atoms per molecule can also be used. Furthermore, various alkoxy, such as methoxy and ethoxy, and cyano derivatives of these conjugated dienes are also applicable.

For the production of the copolymers, the amount of a conjugated diene employed is generally in the range from 25 to 98 parts per 100 parts by weight of the total monomeric material and the amount of copolymerizable heterocyclic nitrogen base employed is in the range from 75 to 2 parts per 100 parts by weight of the total monomeric material, the proportions of the monomeric material being dependent to a large extent upon the type of copolymer desired.

The amount of chloranil used will generally be in the range between 3 and 20 parts by weight, preferably between 3 and 15 parts by weight, per 100 parts of rubbery copolymer.

Chloranil can be incorporated into the rubbery copolymers by any suitable means. One convenient method is to add it on the mill along with other compounding ingredients. This quaternizing agent is reactive under the conditions ordinarily employed for curing a rubber stock. This involves heating at a temperature of 250 to 350 F. for 5 to 90 minutes in most cases.

In addition to their oil resistance, the products of this invention exhibit excellent tensile strength and low temperature properties. They are useful in the manufacture of gaskets and other articles which come in contact with hydrocarbon solvents and hydraulic fluids such as high boiling phosphate esters.

As many possible embodiments may be made of this invention without departing from the scope thereof, it is to be understood that all matter herein set forth is to be interpreted as illustrative and not as unduly limiting the invention.

I claim:

1. A method of preparing an oil resistant rubber comprising mixing a rubbery conjugated diene/heterocyclic nitrogen base polymer with compounding ingredients including a vulcanizing agent and chloranil while maintaining the temperature below 230° F., the amount of said chloranil being in the range of 3 to 20 parts by weight per 100 parts of said rubbery polymer, and thereafter heating the resulting mixture at a temperature of 250 to 350° F. for 5 to 90 minutes to cure the same.

2. A method of preparing an oil resistant rubber comprising mixing a rubbery butadiene/2-vinylpyridine polymer with compounding ingredients including a vulcanizing agent and chloranil while maintaining the temperature below 230° F., the amount of said chloranil being in the range of 3 to 20 parts by weight per 100 parts of said rubbery polymer, and thereafter heating the resulting mixture at a temperature of 250° to 350° F. for 5 to 90 minutes to cure the same.

3. A method of preparing an oil resistant rubber comprising mixing a rubbery butadiene/2-methyl-5-vinylpyridine polymer with compounding ingredients including a vulcanizing agent and chloranil while maintaining the temperature below 230° F., the amount of said chloranil being in the range of 3 to 20 parts by weight per 100 parts of said rubbery polymer, and thereafter heating the resulting mixture at a temperature of 250 to 350° F. for 5 to 90 minutes to cure the same.

4. A method of preparing an oil resistant rubber comprising mixing a rubbery butadiene/2-vinly-5-ethylpyridine polymer with compounding ingredients including a vulcanizing agent and chloranil while maintaining the temperature below 230° F., the amount of said chloranil being in the range of 3 to 20 parts by weight per 100 parts of said rubbery polymer, and thereafter heating the resulting mixture at a temperature of 250 to 350° F. for 5 to 90 minutes to cure the same.

5. A method of producing an oil resistant rubber comprising reacting rubbery butadiene/2-methyl-5-vinylpyridine polymer with compounding ingredients including sulfur and chloranil while maintaining the temperature below 230° F., the amount of said chloranil being in the range of 3 to 20 parts by weight per 100 parts of said rubbery polymer, and thereafter heating the resulting mixture at a temperature of 250 to 350° F. for a period of 5 to 90 minutes to cure the same.

6. The product produced by the process of claim 1.

7. The product produced by the process of claim 3.

References Cited in the file of this patent
UNITED STATES PATENTS 2,658,092    Barton _____ Nov. 3, 1953